United States Patent [19]

Scholin

[11] 4,318,319

[45] Mar. 9, 1982

[54] SEALING RING AND METHOD AND APPARATUS FOR MAKING SAME

[76] Inventor: Harold W. Scholin, 1125 N. Northwest Hwy., Park Ridge, Ill. 60068

[21] Appl. No.: 144,285

[22] Filed: Apr. 28, 1980

Related U.S. Application Data

[60] Division of Ser. No. 29,779, Apr. 13, 1979, which is a continuation of Ser. No. 838,828, Oct. 3, 1977, abandoned.

[51] Int. Cl.³ .......................... B23B 1/00; B23B 3/04; B23B 3/00
[52] U.S. Cl. .......................................... 82/47; 82/48; 82/82; 82/98; 82/1 C
[58] Field of Search .................. 82/46, 47, 48, 56, 60, 82/70.1, 82, 98, 101, 1 C, 1 R

[56] References Cited

U.S. PATENT DOCUMENTS

| 873,366 | 12/1907 | Giles | 82/47 |
|---|---|---|---|
| 929,679 | 8/1909 | Lorenz | 82/47 |
| 2,304,828 | 12/1942 | Joy | 82/98 |
| 3,163,063 | 12/1964 | Corrigan | 82/101 |
| 3,207,826 | 9/1965 | Yost | 82/47 |
| 3,381,361 | 5/1968 | DeCuissart et al. | 82/47 |
| 3,545,321 | 12/1970 | Phelps et al. | 82/47 |
| 3,611,847 | 10/1971 | Derman et al. | 82/47 |
| 3,916,737 | 11/1975 | Libicki | 82/98 |
| 4,046,038 | 9/1977 | West | 82/46 |
| 4,126,064 | 11/1978 | Tarrant | 82/1 C |

*Primary Examiner*—Harrison L. Hinson
*Attorney, Agent, or Firm*—Emrich, Root, Lee, Brown & Hill

[57] ABSTRACT

A sealing ring is disclosed which is formed of an elastomeric material wherein the cross section thereof has a plurality of substantially flat surfaces, and wherein the inner and outer diameter surfaces, which are the sealing surfaces thereof, are molded surfaces. The remaining surfaces are machined or cut surfaces. The preferred number of surfaces or faces in cross section is 8, and this has been found to give the best results, although other numbers of surfaces may also be used. Since the ring itself is not a molded ring, but has only the inner and outer surfaces thereof which are molded, there is also disclosed a novel method of making such a ring, as well as a novel apparatus for use in a carrying out the method of making the ring, wherein a molded elastomeric sleeve is provided and wherein inclined surfaces are cut therein in such a way that when the ring is severed from the sleeve it will have the desired number of flat surfaces.

8 Claims, 12 Drawing Figures

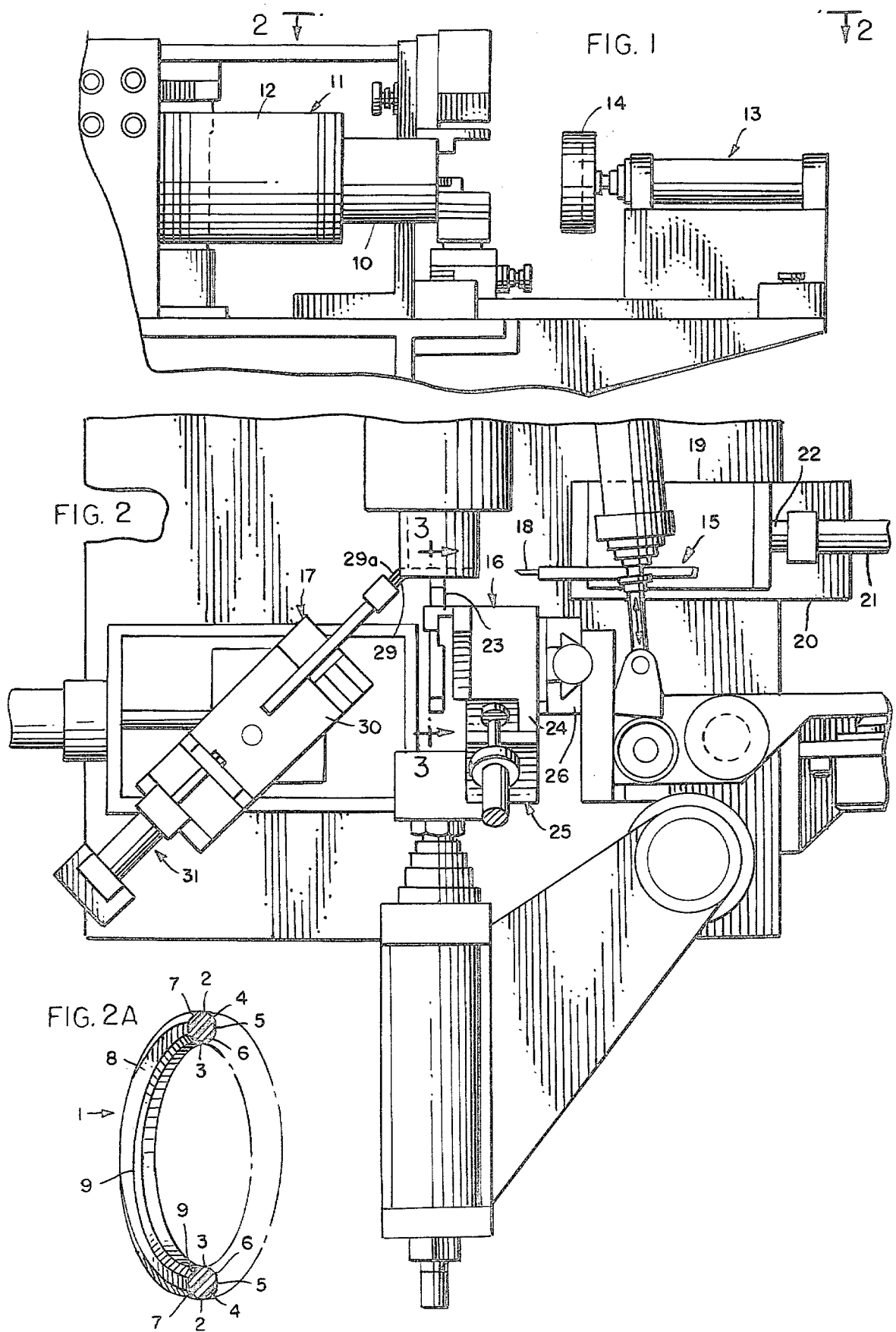

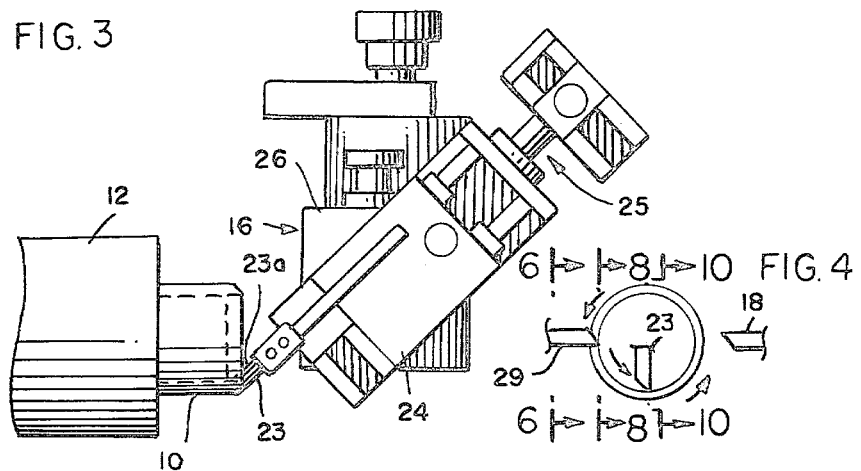
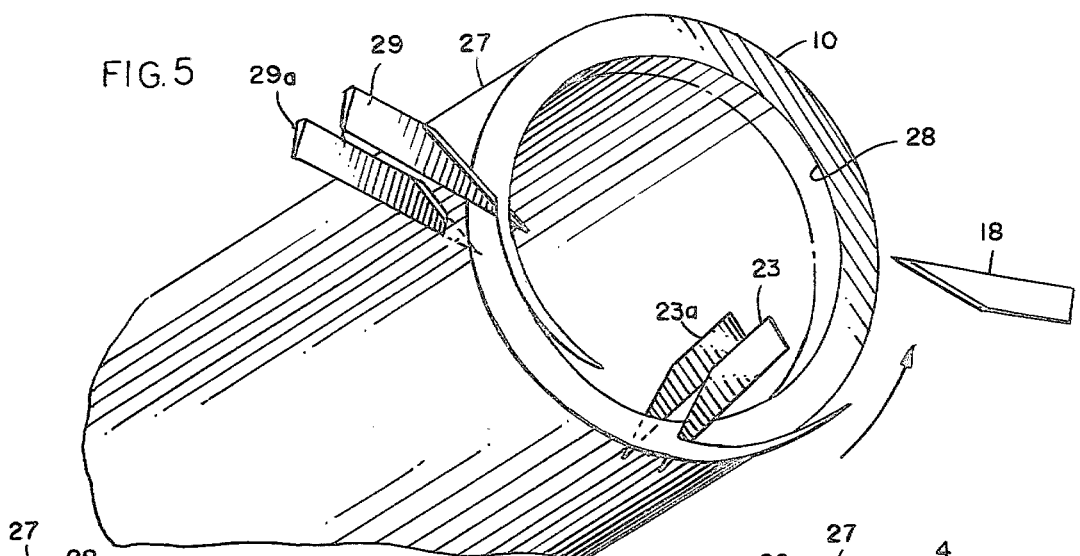
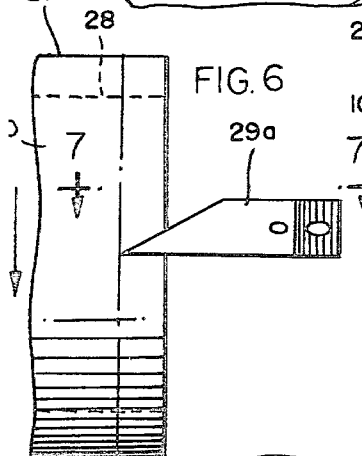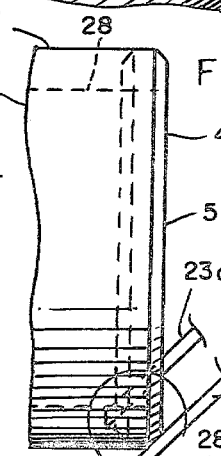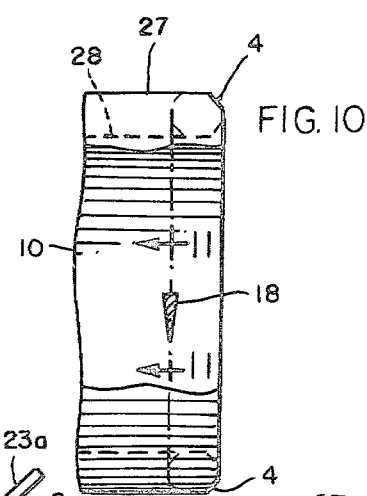
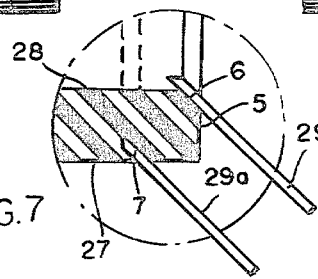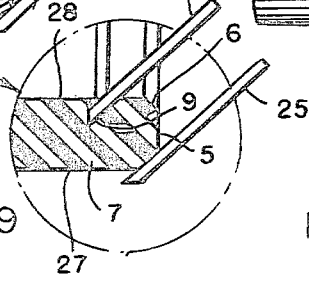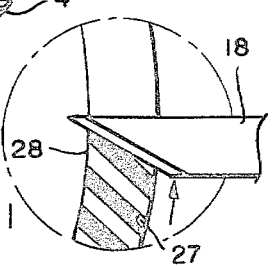

SEALING RING AND METHOD AND APPARATUS FOR MAKING SAME

This is a division; of application Ser. No. 29,779, filed Apr. 13, 1979, which is a continuation of application Ser. No. 838,828, filed Oct. 3, 1977 now abandoned.

BACKGROUND OF THE INVENTION

There has been a wide variety of sealing rings developed with different cross sectional shapes for use in piston and rod seals for cylinder application, the most common being the O-ring, having a circular cross section. There have also been made sealing rings with other cross sectional shapes such as V-rings, X-rings, square rings and rings having lip seals.

The most commonly used sealing ring is the O-ring, but in making this ring it must be molded, which thereupon provides a flash line around the ring resulting in inconsistency of the sealing surface thereby requiring a greater squeezing force to seal.

Tests show that the best results are obtained when the sealing surfaces of the rings are molded surfaces rather than cut or machined surfaces, particularly when run against a hardened metal surface, but when O-rings or square rings are molded they still have the disadvantages of the flash line.

The disadvantages of a flash line on a molded ring were obviated and the advantages of molded inner and outer sealing surfaces were obtained by the machine disclosed in the Scholin and Lisiecke U.S. Pat. No. 4,030,385 issued June 21, 1977, wherein a sleeve molded of an elastomeric material is cut into a series of rings, each of which is square or rectangular in cross section.

O-rings in dynamic applications have a tendency to roll or twist, and their sealing characteristics are relatively poor compared to those having other cross sectional shapes, such as square. The square ring, on the other hand, even when made in accordance with the teachings of the above mentioned patent, has a very high resistance to sliding forces and has a very high sliding friction. Furthermore, the inconsistency of the manufacture of O-rings causes many problems. For example, excessive flash lines, areas where flash lines are buffed away and mismatching cause strange leakage problems.

BRIEF SUMMARY OF THE INVENTION

The invention relates generally to a novel elastomeric sealing ring which is multisided in cross section, preferably eight sides, and to the method and apparatus for making same. More specifically, the invention relates to an elastomeric sealing ring having preferably eight or more sides or faces in cross section, wherein the surfaces of the inner and outer diameters, which are the sealing surfaces, are molded surfaces.

Since one of the features of the sealing ring is to improve the performance thereof by eliminating the flash line, another aspect of the invention is the method of making the ring, as well as the apparatus used in carrying out the method.

In making the sealing ring a sleeve is molded from an elastomeric material and placed on a mandrel with one end extending beyond the end of the mandrel. Suitable knife edges are provided which, by the use of suitable control means are caused to cut away the corners from the inner and outer diameters of the sleeves at the outer end thereof, thus forming inclined surfaces. Knife edges are also provided to make inclined cuts into the surfaces of the inner and outer diameters of the sleeve at a predetermined distance inwardly from the outer end thereof. A cut-off knife edge is also provided to sever the ring from the sleeve by cutting through the sleeve in a radial plane intersecting the two last named inclined cuts. These operations will result in providing a sealing ring having a plurality of surfaces in cross section, wherein the inner and outer sealing surfaces are molded surfaces.

In view of the foregoing it is a principle object of the present invention to provide a novel form of an elastomeric sealing ring which has molded sealing surfaces and is multifaced in cross section, wherein the faces, other than the sealing surfaces are formed by a machining operation, such as cutting.

Another object of the invention is to provide a novel method of making an elastomeric sealing ring which is multifaced in cross section, wherein a molded sleeve is provided and rings are severed successively from one end of the sleeve and wherein the faces are formed on the ring prior to being severed from the sleeve.

A further object of the invention is to provide a novel apparatus for carrying out the method of making an elastomeric sealing ring having a plurality of surfaces in cross section, wherein a plurality of knife edges are mounted for movement into contact with a rotating molded sleeve in such manner as to cut a plurality of inclined faces therein and then to sever a ring therefrom.

Other objects and advantages of the invention will appear more fully hereinafter as the description proceeds.

DESCRIPTION OF THE DRAWINGS

FIG. 1 is a fragmentary side elevational view of an apparatus for use in carrying out the method of making a sealing ring in accordance with the present invention.

FIG. 2 is a top plan view, somewhat enlarged, of that portion of the apparatus shown in FIG. 1.

FIG. 2A is a fragmentary perspective view of the preferred form of the sealing ring of the present invention showing the cross sectional shape thereof.

FIG. 3 is a side elevational view of one of the knife edge assemblies for cutting inclined faces on the sealing ring and is taken substantially along the plane of line 3—3 of FIG. 2.

FIG. 4 is an end elevational view of a molded sleeve showing somewhat diagramatically the relative positions of the various knife edges used in forming the sealing ring of the present invention.

FIG. 5 is an enlarged perspective view of a molded sleeve illustrating the cutting action of the various knife edges which form the inclined faces of the sealing ring of the present invention.

FIG. 6 is an enlarged fragmentary side elevational view taken along the plane of line 6—6 of FIG. 4.

FIG. 7 is a sectional detail showing the cutting action of the knife edges of FIG. 6 and taken along the plane of line 7—7 of FIG. 6.

FIG. 8 is an enlarged fragmentary side elevational view taken along the plane of line 8—8 of FIG. 4.

FIG. 9 is an enlarged sectional detail showing the cutting action of the knife edges of FIG. 8.

FIG. 10 is an enlarged fragmentary side elevational view taken along the plane of line 10—10 of FIG. 4, and FIG. 11 is an enlarged detail showing the cutting action of the ring severing knife edge taken substantially along the plane of line 11—11 of FIG. 10.

DETAILED DESCRIPTION OF THE INVENTION

Referring now more particularly to the drawings and especially to FIG. 2A, there is illustrated the sealing ring of the present invention. The ring is indicated generally by the numeral 1. The surfaces of the outer and inner diameters of the ring will constitute the sealing surfaces, depending upon the manner in which the ring is used. For example, if the ring is to be placed in the ring groove of a piston, then the surface 2 of the outer diameter will be the sealing surface. On the other hand if the ring is to be placed in the groove of a wall within which a rod reciprocates, then the surface 3 of the inner diameter of the ring will form the sealing surface.

As noted heretofore, an important aspect of the invention is that these outer and inner sealing surfaces 2 and 3 are molded surfaces. In the preferred form of the invention the ring will have eight sides or faces in cross section. The faces in addition to the surfaces of the outer and inner diameters, are indicated by the numerals 4, 5, 6, 7, 8 and 9. The faces 4, 6, 7 and 9 are all inclined with respect to the axis of the ring, while the remaining faces 5 and 8 are substantially perpendicular to the axis. It is important that all of these last mentioned six faces are formed by a suitable machining operation, such as by cutting.

FIG. 1 of the drawings is a fragmentary reproduction of FIG. 1 of U.S. Pat. No. 4,030,385 mentioned heretofore. In order to form the surfaces of the inner and outer diameters of the ring of a molded surface, the rings are cut from a sleeve which is molded from an elastomeric material. In FIG. 1 this sleeve is indicated by the numeral 10 and, as described in the aforesaid patent, the sleeve is placed upon a mandrel and is caused to be advanced on the mandrel by suitable indexing means generally indicated by the numeral 11 a distance equal to the thickness of a ring, after each ring has been severed from the sleeve. The cylinder 12 is provided with suitable means in contact with the sleeve 10 which are actuated to advance the sleeve, all as more fully described in the aforesaid patent.

This part of the apparatus does not form any part of the present invention, but is described herein briefly for the purpose of illustrating the cooperation between this part of the apparatus and that part which is directed to the present invention. In the aforesaid machine there is also provided a tailstock assembly 13 which, in turn, has a piston and cylinder arrangement with a loading cup 14 at the outer end of the piston rod. Although the sleeve may be loaded onto the mandrel by hand, it is preferred, for safety purposes, that the sleeve first be mounted in the loading cup 14 and then advanced onto the mandrel. The outer end of the sleeve extends beyond the end of the mandrel thereby to enable various cutting operations to be performed on the ring and to enable a suitably positioned knife edge to be moved in a radial plane through the sleeve and sever a ring therefrom.

Suitably positioned knife edges are used for the purpose of performing cutting operations in the sleeve to form the completed sealing ring. It will be evident that the machined surfaces of the ring can be obtained by cutting each surface individually and either simultaneously or in succeeding steps. One of the features of the present invention which relates to the process of making a ring, is the provision of a plurality of cutting assemblies, two of which are provided with pairs of knife edges, thereby to enable at least two of the inclined surfaces to be cut simultaneously.

In FIG. 2 of the drawings these cutting assemblies are indicated generally by the numerals 15, 16 and 17. The cutting assembly 15 is provided with a single knife edge 18 which is shown as being mounted upon a slide member 19, slidable with respect to the support 20. The construction and operation of this knife is well known to those skilled in this art, and it is therefore sufficient to note primarily that the slide 19 is mounted for reciprocating movement in suitable guideways and is advanced and retracted by means of an air operated hydraulic pump, wherein hydraulic fluid in the cylinder 21 is forced by air to move the piston 22 to which the slide 19 and knife edge 18 are secured. By providing suitable valving the knife is caused to advance after the last inclined surface is cut, thereby to sever the ring from the sleeve, and thereafter to be retracted at the end of each cutting operation. This operation was previously disclosed in the aforesaid patent.

The cutting assembly 16 is similarly constructed and operates in substantially the same way as just described with respect to the cutting assembly 15. More specifically, it is preferred that the cutting assembly 16 be provided with a pair of knife edges 23 and 23a. These are mounted in spaced apart relation on a slide member 24 which is also mounted for reciprocating movement between an advanced cutting position and a retracted position by means of a similar air-hydraulic system 25. The cutting assembly may be adjustably mounted on a suitable support 26 so that it may be adjusted to a proper position for the cutting of a pair of inclined surfaces as one of the steps in forming the eight sided sealing ring. The adjustment is necessary to accommodate the forming of rings of different diameters and different thicknesses wherein the inclined surfaces may vary in width and depth.

The outer molded surface of the sleeve 10 is indicated by the numeral 27 and the molded surface of the inner diameter of the sleeve is indicated by the numeral 28. FIG. 3 illustrates the position of the knife edges 23 and 23a as being angular with respect to the axis of the sleeve, and knives are so positioned as to be advanced downwardly into the surfaces of the sleeve at the outer end thereof at a location below the axis.

FIGS. 5, 8 and 9 illustrate the action of these knife edges. As the pair of knife edges 23 and 23a is advanced into the position thereof shown in these figures, while the sleeve is rotating in a counter clockwise direction as viewed in FIG. 5, the knife edge 23 will cut an inclined surface at the outer end of the sleeve which intersects the outer surface 27 of the sleeve. This knife edge, therefore, will provide the inclined surface 4 as shown in FIG. 2A.

Simultaneously the knife edge 23a will be advanced and will cut an inclined surface through the inner surface of the sleeve at a predetermined distance inwardly from the outer end thereof. When the ring is severed from the sleeve, as will become more apparent hereinafter, this inclined surface which has just been cut by the knife edge 23a will become the inclined surface 9 of the ring.

The cutting assembly 17 includes a pair of knife edges 29 and 29a similarly mounted on a slide member 30 which is caused to advance to cutting position and to be retracted by a similar air-hydraulic system generally indicated by the numeral 31.

The preferred relative positions of the knife edges 18, 23 and 23a, and 29 and 29a are as shown in FIG. 4. These positions are not critical, since all that is necessary is that these cutting assemblies be positioned in such a way that they can be advanced to cutting position at the proper time and retracted without interferring with the movements of each other.

Reference is now made particularly to FIGS. 5, 6 and 7 for an understanding of the operation and results of the knife edges 29 and 29a. As these knife edges are advanced to cutting position, the knife edge 29 will cut an inclined surface which intersects the surface 28 of the inner diameter of the sleeve. As may be seen more clearly from FIG. 7, the knife edge 29 forms the inclined surface 6 of the completed ring shown in FIG. 2A.

The other knife edge 29a simultaneously cuts an inclined surface which intersects the outer surface 27 of the outer diameter of the sleeve at a predetermined distance inwardly from the outer end of the sleeve. This cut then forms the inclined surface 7 of the completed ring shown in FIG. 2A.

These cutting operations of the knife edges 23 and 23a of one cutting assembly, and the knife edges 29 and 29a of the other cutting assembly, may be performed simultaneously or successively. It is evident that, if performed successively, the order of succession is immaterial. After the knife edges 29 and 29a have cut and formed the inclined surfaces 6 and 7 of the ring, and after the knife edges 23 and 23a have cut the inclined surfaces 4 and 9 of the ring, and these knife edges have been retracted, the knife edge 18 is caused to advance in a radial direction to cut through the sleeve and to intersect the cuts which have formed the inclined surfaces 7 and 9, thereby to sever the ring from the sleeve. When the sleeve has been severed the ring will appear as shown in FIG. 2A where the outer and inner sealing surfaces 2 and 3 will be molded surfaces and all of the other faces will be machined, such as by cutting. The surface 5 will be formed by the outer end of the sleeve, and the surface 8 will be formed by the cutting action of the knife edge 18 whereby the surface 8 of the completed ring will be formed at the same time as the surface 5 is formed on the next succeeding ring.

Although the basic apparatus used in the making of this ring is disclosed in the aforesaid patent, the apparatus comprising the twin bladed knife edges for carrying out the method of making the sealing ring having eight faces in cross section, are novel.

The foregoing described apparatus and method result in a novel sealing ring which is low in cost, can be produced rapidly, is easy to install, has a low breakaway force with a molded sliding surface free of flash lines. It has been found in actual practice and in comparative tests with other sealing rings heretofore known to have superior sealing qualities, and can be used as static seals as well as dynamic and are interchangable with O-rings but give greater precision and accuracy.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

I claim:

1. The method of making a sealing ring of an elastomeric material, wherein the cross section thereof has at least eight substantially flat surfaces, comprising the steps of
   (a) providing a sleeve formed of an elastomeric material, the surfaces of the inner and outer diameters thereof being molded surfaces,
   (b) forming inclined surfaces
      (1) intersecting the surfaces of the inner and outer diameters of said sleeve at one end thereof, and
      (2) intersecting the surfaces of the inner and outer diameters of said sleeve a predetermined distance inwardly from said one end thereof, and
   (c) thereafter severing a ring from said sleeve along a radial plane intersecting said last named inclined surfaces.

2. The method of making a sealing ring of an elastomeric material, wherein the cross section thereof has at least eight substantially flat surfaces, comprising the steps of
   (a) providing a sleeve formed of an elastomeric material, the surfaces of the inner and outer diameters thereof being molded surfaces,
   (b) simultaneously forming inclined surfaces intersecting the surface of the outer diameter of said sleeve at one end thereof and the inner diameter of said sleeve at a predetermined distance inwardly from said one end thereof,
   (c) simultaneously forming inclined surfaces intersecting the inner diameter of said sleeve at one end thereof and the outer diameter of said sleeve at a predetermined distance inwardly from said one end thereof, and
   (d) thereafter severing a ring from said sleeve along a radial plane intersecting the said inclined surfaces which intersect the inner and outer diameters of said sleeve at a predetermined distance inwardly from said one end thereof.

3. The method defined in claim 2, wherein the steps recited in (b) and (c) are performed by a cutting operation.

4. The method defined in claim 2, wherein the step recited in (b) is performed by cutting with a first knife assembly having a pair of spaced apart cutting edges, and the step of (c) is performed by cutting with a second knife assembly having a pair of spaced apart cutting edges.

5. Apparatus for making a sealing ring of an elastomeric material, wherein the cross section thereof has at least eight substantially flat surfaces, comprising
   (a) a rotatable mandrel adapted to receive and hold thereon a sleeve formed of an elastomeric material and having inner and outer diameters thereon, the outer end of said sleeve extending beyond one end of said mandrel,
   (b) a first pair of spaced apart, substantially parallel knife edges positioned adjacent the outer end of said sleeve at a predetermined angle with respect to the axis of said sleeve, and movable between a retracted position and an advanced cutting position,
   (c) a second pair of spaced apart, substantially parallel knife edges positioned adjacent the outer end of said sleeve at a predetermined angle with respect to the axis of said sleeve, the angle of said second pair of knife edges being different from the angle of said first pair of knife edges, and movable between a retracted position and an advanced cutting position, (d) means for rotating said sleeve, (e) means for advancing one of said pairs of knife edges into contact with said sleeve thereby simultaneously to cut an inclined surface intersecting one of the diameters of said sleeve at the outer end thereof and an inclined surface intersecting the other diameter of said sleeve at a predetermined distance inwardly from the outer end thereof, (f) means for advancing the other of said pairs of knife edges into contact with said sleeve, thereby simultaneously to cut an inclined surface intersecting said other diameter of said sleeve at the outer end thereof and an inclined surface intersecting said one diameter of said sleeve at a predetermined distance inwardly from the outer end thereof, and (g) means for severing a ring from said sleeve along a radial plane intersecting the said inclined surfaces which intersect the inner and outer diameters of said sleeve at a predetermined distance inwardly from said outer end thereof.

6. The combination of elements defined in claim 5, wherein said last named means comprises a knife edge movable in a radial plane with respect to the axis of said sleeve between a retracted position and an advanced cutting position.

7. The combination of elements defined in claim 5, combined with indexing means for advancing the sleeve on said mandrel a distance substantially equal to the width of the ring to be cut therefrom after the ring has been severed therefrom.

8. The combination of elements defined in claim 7, wherein said means for severing a ring from the sleeve comprises a knife edge movable in a radial plane with respect to the axis of the sleeve between a retracted position and an advanced cutting position, and wherein said indexing means is operable in response to movement of said knife edge from an advanced cutting position to the retracted position thereof.

* * * * *